United States Patent
Kishioka et al.

(10) Patent No.: US 7,097,903 B2
(45) Date of Patent: Aug. 29, 2006

(54) DOUBLE-SIDED PRESSURE-SENSITIVE ADHESIVE SHEET AND METHOD FOR STICKING AND FIXING TOUCH PANEL TO DISPLAY DEVICE

(75) Inventors: Hiroaki Kishioka, Ibaraki (JP); Masahiro Ohura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/368,377

(22) Filed: Feb. 20, 2003

(65) Prior Publication Data

US 2003/0232192 A1 Dec. 18, 2003

(30) Foreign Application Priority Data

Feb. 21, 2002 (JP) .................... P2002-044759

(51) Int. Cl.
*C09J 7/02* (2006.01)
*G09G 5/00* (2006.01)

(52) U.S. Cl. ............... 428/354; 428/343; 428/355 AC; 428/355 RA; 428/40.1; 427/208; 427/208.4; 156/306.6

(58) Field of Classification Search .............. 428/354, 428/343, 355 AC, 355 RA, 356, 40.1; 427/208, 427/208.4; 156/306.6; 345/176, 173; 385/130; 349/199
See application file for complete search history.

(56) References Cited

U.S. PATENT DOCUMENTS

| | | | |
|---|---|---|---|
| RE24,906 E * | 12/1960 | Ulrich .................. | 206/59 |
| 6,162,319 A | 12/2000 | Ohura et al. | |
| 6,228,965 B1 | 5/2001 | Muta et al. | |
| 2002/0158853 A1* | 10/2002 | Sugawara et al. ......... | 345/176 |
| 2003/0232192 A1* | 12/2003 | Kishiska et al. ............. | 428/354 |

FOREIGN PATENT DOCUMENTS

| | | |
|---|---|---|
| CN | 1226914 A | 8/1999 |
| CN | 1245521 A | 2/2000 |
| JP | 2-66809 A | 3/1990 |
| JP | 6-309101 A | 11/1994 |
| JP | 10-222305 A | 8/1998 |
| JP | 10-260395 A | 9/1998 |
| JP | 2000-207123 A | 7/2000 |
| JP | 2000-207983 A | 7/2000 |
| JP | 3118431 B2 | 10/2000 |

* cited by examiner

*Primary Examiner*—Daniel Zirker
(74) *Attorney, Agent, or Firm*—Sughrue Mion, PLLC

(57) ABSTRACT

A double-sided pressure-sensitive adhesive sheet for fixing a touch panel to a display device wherein one surface of the double-sided pressure-sensitive adhesive sheet is stuck to the surface of the touch panel while the other surface of the double-sided pressure-sensitive adhesive sheet is stuck to a display surface of the display device, the double-sided pressure-sensitive adhesive sheet including: a transparent base; a first transparent pressure-sensitive adhesive layer formed on one surface of the transparent base; and a second transparent pressure-sensitive adhesive layer formed on the other surface of the transparent base; wherein the double-sided pressure-sensitive adhesive sheet is releasable and re-stickable to the display surface while being stuck to the touch panel.

2 Claims, 3 Drawing Sheets

DOUBLE-SIDED PRESSURE-SENSITIVE ADHESIVE SHEET AND METHOD FOR STICKING AND FIXING TOUCH PANEL TO DISPLAY DEVICE

The present application is based on Japanese Patent Application No. 2002-44759, the entire contents of which are incorporated herein by reference.

BACKGROUND OF THE INVENTION

1. Field of the Invention

The present invention relates to a double-sided pressure-sensitive adhesive sheet used for sticking and fixing a touch panel to a display surface of a display device, and a method for sticking and fixing a touch panel to a display device.

2. Related Art

Figure 3:
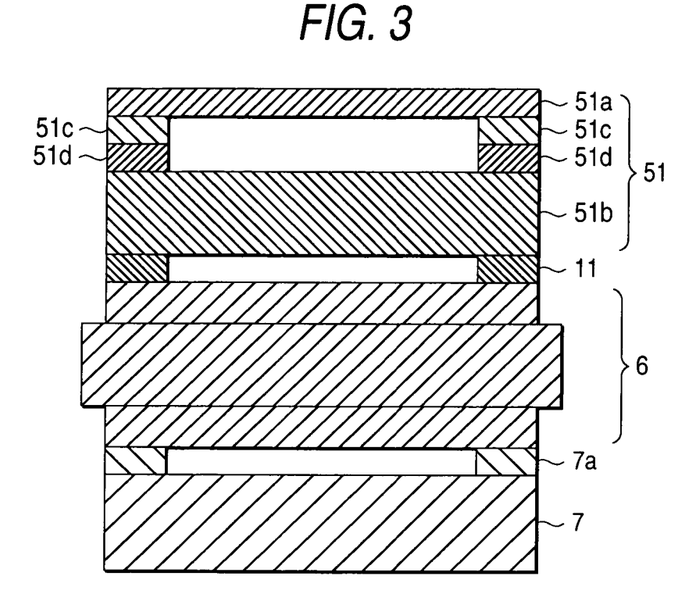
FIG. 3 is a schematic sectional view showing an example of a related-art F/G type touch panel.
Figure 4:
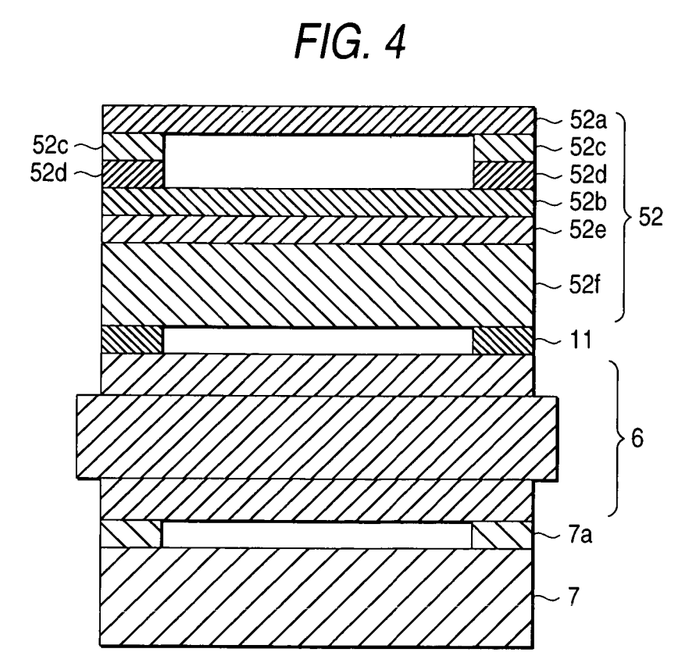
FIG. 4 is a schematic sectional view showing an example of a related-art F/F/P type touch panel.

A large market for mobile communication terminals (e.g., mobile telephone terminals such as cellular phones and PHS machines, and PDA terminals) have been formed in recent years. The main technical streams for the mobile communication terminals are directed to reduction in thickness, reduction in weight, reduction in power consumption, increase in definition, increase in luminance, and so on. Particularly from the point of view of reduction in weight and breaking prevention, a touch panel used as an input device in a PDA has begun to shift from a touch panel having a configuration (F/G type) in which a transparent electrically conductive plastic film [e.g., a transparent electrically conductive plastic film such as a transparent electrically conductive polyethylene terephthalate film (electrically conductive PET film) having a polyethylene terephthalate film as a base and an electrically conductive layer such as ITO (Indium Tin Oxide) formed on one surface of the polyethylene terephthalate film] is stuck to an electrically conductive glass sheet by a pressure-sensitive adhesive agent as shown in FIG. 3 to a touch panel having a configuration (F/F/P type) in which two transparent electrically conductive plastic films (such as electrically conductive PET films) having electrically conductive layer-forming surfaces disposed opposite to each other are stuck to a transparent substrate of polycarbonate or the like as a reinforcing member through a transparent pressure-sensitive adhesive agent as shown in FIG. 4. Incidentally, the touch panel is stuck and fixed to an LCD module through a pressure-sensitive adhesive layer shaped like a picture frame on the LCD module.

FIG. 3 is a schematic sectional view showing an example of the related-art F/G type touch panel. FIG. 4 is a schematic sectional view showing an example of the related-art F/F/P type touch panel. In FIGS. 3 and 4, the reference numeral 11 designates a double-sided pressure-sensitive adhesive tape; 51, an F/G type touch panel; 51a, an electrically conductive PET film on the upper side; 51b, an electrically conductive glass sheet on the lower side; 51c, an adhesive layer; 51d, a silver paste layer; 52, an F/F/P type touch panel; 52a, an upper electrically conductive PET film; 52b, a lower electrically conductive PET film; 52c, an adhesive layer; 52d, a silver paste layer; 52e, a double-sided pressure-sensitive adhesive tape; 52f, a reinforcing plate; 6, an LCD module; 7, a backlight unit; and 7a, a double-sided pressure-sensitive adhesive tape.

In the F/F/P type configuration as shown in FIG. 4, however, two air interfaces are formed between the electrically conductive plastic films 52a and 52b of the touch panel 52 and between the touch panel 52 and the LCD module 6. For this reason, there arises a problem that light loss due to reflection is large. There also arises a problem that the touch panel 52 is thick. These problems are considerably serious against the stream of reduction in power consumption, increase in luminance, reduction in thickness, and so on.

Figure 5:
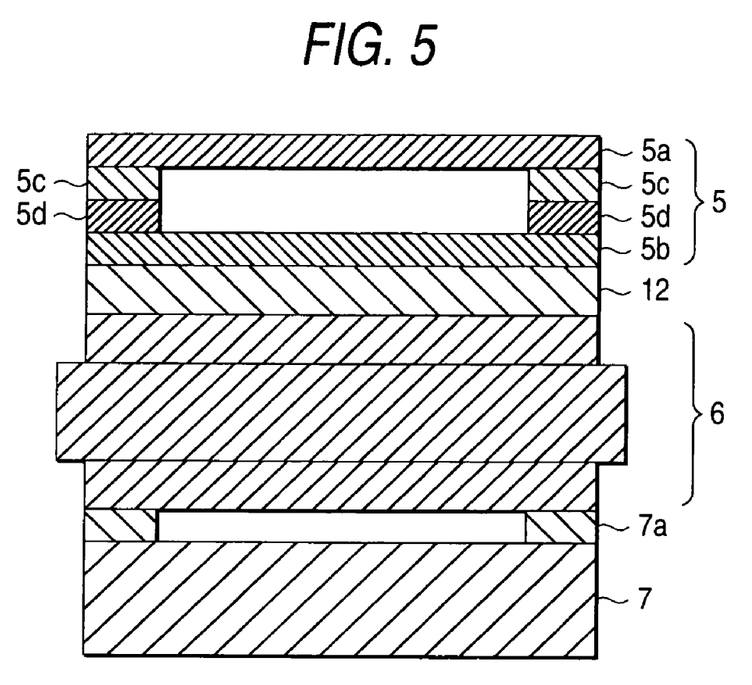
FIG. 5 is a schematic sectional view showing an example of a related-art F/F type touch panel.

A touch panel having a configuration (F/F type configuration) in which electrically conductive layer-forming surfaces of two transparent electrically conductive plastic films are disposed opposite to each-other as shown in FIG. 5 has been proposed newly on such circumstances. FIG. 5 is a schematic sectional view showing an example of the related-art F/F type touch panel. In FIG. 5, the reference numeral 12 designates a double-sided pressure-sensitive adhesive sheet; 5, a touch panel; 5a, an upper electrically conductive PET film; 5b, a lower electrically conductive PET film; 5c, an adhesive layer; and 5d, a silver paste layer. Incidentally, the reference numerals 6, 7 and 7a designate an LCD module, a backlight unit and a double-sided pressure-sensitive adhesive tape respectively like FIG. 3 and FIG. 4.

In the F/F type configuration, air interfaces can be reduced more greatly, so that the thickness of the touch panel 5 can be reduced. When the related-art double-sided pressure-sensitive adhesive sheet 12 (such as a pressure-sensitive adhesive tape) is used, the touch panel 5 and the LCD module 6 are, however, bonded to each other so firmly that they cannot be mended after they have been bonded to each other once. Hence, the LCD module 6 and the touch panel 5 cannot be discarded if they are stuck to each other improperly. In addition, transparency is low. Hence, there is a problem that light transmittance as a whole is reduced even in the case where reflection loss is reduced due to reduction in the air interfaces.

SUMMARY OF THE INVENTION

An object of the invention is to provide a double-sided pressure-sensitive adhesive sheet capable of being stuck to a display surface of a display device repeatedly and well and having excellent light transmitting characteristic when used for sticking and fixing a touch panel to the display surface of the display device, and a method for sticking and fixing a touch panel to a display device by the double-sided pressure-sensitive adhesive sheet.

Another object of the invention is to provide a double-sided pressure-sensitive adhesive sheet in which the tone of color can be prevented from varying as well as transmittance of light from a display device can be restrained or prevented from being reduced even in the case where the double-sided pressure-sensitive adhesive sheet is applied to an F/F type touch panel and in which the touch panel can be easily separated from a display surface of the display device and stuck thereto again, and a method for sticking and fixing a touch panel to a display device by the double-sided pressure-sensitive adhesive sheet.

The inventors have made examinations eagerly to achieve the foregoing objects. As a result, it has been found that when a double-sided pressure-sensitive adhesive sheet having a transparent base, and transparent pressure-sensitive adhesive layers which are formed on opposite surfaces of the transparent base so as to be stuck to a touch panel and a display surface of a display device respectively and which have specific tackiness is used as a double-sided pressure-sensitive adhesive sheet used for sticking and fixing a touch panel to a display surface of a display device, the double-sided pressure-sensitive adhesive sheet has excellent light transmitting characteristic as well as the touch panel can be easily detached from and stuck to the display surface of the display device again after the touch panel has been once stuck and fixed to the display surface of the display device through the double-sided pressure-sensitive adhesive sheet. Thus, the invention has been accomplished.

That is, the invention provides a double-sided pressure-sensitive adhesive sheet used for sticking and fixing a touch panel to a display surface of a display device in such a manner that one surface of the double-sided pressure-sensitive adhesive sheet is stuck to the substantially whole surface of the touch panel while the other surface of the double-sided pressure-sensitive adhesive sheet is stuck to the substantially whole display surface of the display device, the double-sided pressure-sensitive adhesive sheet including: a transparent base; a first transparent pressure-sensitive adhesive layer formed on one surface of the transparent base; and a second transparent pressure-sensitive adhesive layer formed on the other surface of the transparent base; wherein the double-sided pressure-sensitive adhesive sheet enables to be released from the display surface of the display device while being stuck to the touch panel.

Preferably, in the invention, the first transparent pressure-sensitive adhesive layer exhibits 180° peel adhesion (at a peeling rate of 300 mm/min, at 23° C. and to a polyethylene terephthalate film) of not lower than 3.5 N/20 mm whereas the second transparent pressure-sensitive adhesive layer exhibits 180° peel adhesion (at a peeling rate of 300 mm/min, at 23° C. and to a triacetyl cellulose film) of from 0.1 N/20 mm to 3.0 N/20 mm. Preferably, the double-sided pressure-sensitive adhesive sheet has a total light ray transmittance of not lower than 90% in a visible wavelength region and has a haze of not higher than 2.0%.

The invention also provides a method of sticking and fixing a touch panel to a display device, including the steps of: sticking a second transparent pressure-sensitive adhesive layer of a double-sided pressure-sensitive adhesive sheet defined above to the substantially whole of a display surface of the display device; and sticking a first transparent pressure-sensitive adhesive layer of the double-sided pressure-sensitive adhesive sheet to the substantially whole of a surface of the touch panel to thereby stick the touch panel to the display surface of the display device. In the method, the touch panel may be constituted by two transparent electrically conductive plastic films having electrically conductive layers disposed opposite to each other, and the display device may be constituted by a liquid-crystal display device.

DETAILED DESCRIPTION OF THE PREFERRED EMBODIMENTS

The invention will be described below with reference to the drawings. Incidentally, like numerals may refer to like members or portions.

Figure 1:
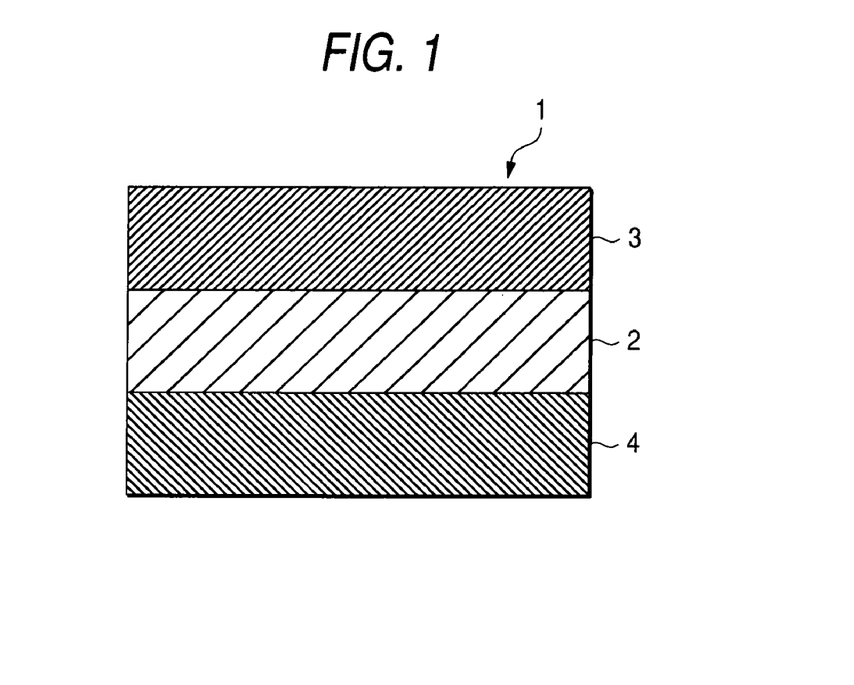
FIG. 1 is a schematic sectional view partially showing a double-sided pressure-sensitive adhesive sheet according to an embodiment of the invention.
Figure 2:
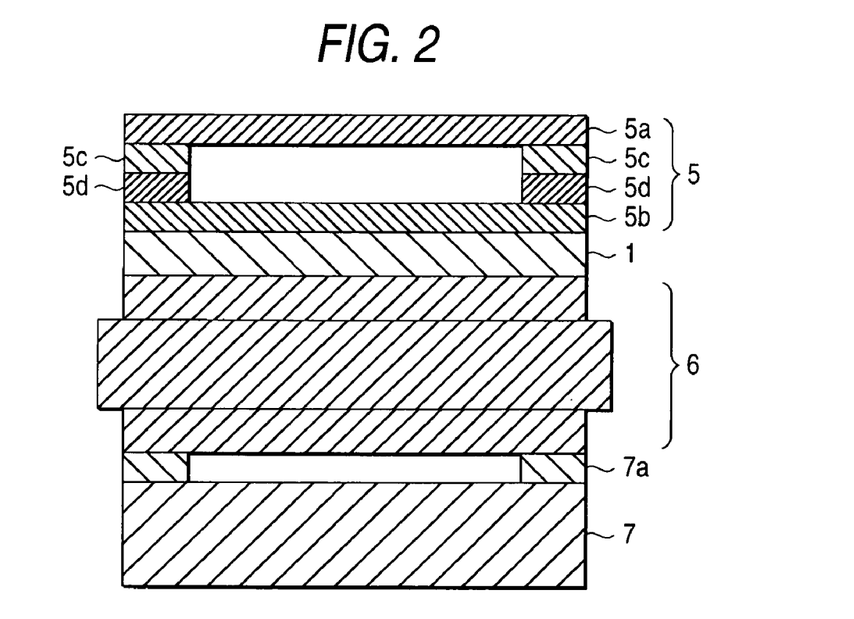
FIG. 2 is a schematic sectional view showing an example of configuration in the case where the double-side pressure-sensitive adhesive sheet according to the invention is used.

FIG. 1 is a schematic sectional view partially showing a double-sided pressure-sensitive adhesive sheet according to an embodiment of the invention. In FIG. 1, the reference numeral 1 designates a double-sided pressure-sensitive adhesive sheet; 2, a transparent base; 3, a touch panel side transparent pressure-sensitive adhesive layer (first transparent pressure-sensitive adhesive layer); and 4, a display device side transparent pressure-sensitive adhesive layer (second transparent pressure-sensitive adhesive layer). The double-sided pressure-sensitive adhesive sheet 1 is provided in such a manner that the touch panel side transparent pressure-sensitive adhesive layer 3 is formed on one surface of the transparent base 2 while the display device side transparent pressure-sensitive adhesive layer 4 is formed on the other surface of the transparent base 2. For example, as shown in FIG. 2, the double-sided pressure-sensitive adhesive sheet 1 according to the invention can be used when a touch panel having two electrically conductive PET films (transparent electrically conductive polyethylene terephthalate films each having a polyethylene terephthalate film as a base, and an electrically conductive layer such as ITO formed on one surface of the base) is stuck to a display device. FIG. 2 is a schematic sectional view showing an example of configuration in the case where the double-sided pressure-sensitive adhesive sheet according to the invention is used. In FIG. 2, the reference numerals 1, 5, 5a, 5b, 5c, 5d, 6, 7 and 7a designate a double-sided pressure-sensitive adhesive sheet, a touch panel, an upper electrically conductive PET film, a lower electrically conductive PET film, an adhesive layer, a silver paste layer, an LCD module, a backlight unit and a double-sided pressure-sensitive adhesive tape respectively like FIG. 5.

The embodiment shown in FIG. 2 is an embodiment concerning a liquid-crystal display device in which the LCD module 6 is used as a display device. In FIG. 2, the touch panel 5 having two electrically conductive PET films 5a and 5b is stuck to one surface of the LCD module 6 through the double-sided pressure-sensitive adhesive sheet 1 while the backlight unit 7 is stuck to the other surface (the surface opposite to the touch panel 5) of the LCD module 6 through the double-sided pressure-sensitive adhesive tape 7a shaped like a frame. More specifically, one surface of the double-sided pressure-sensitive adhesive sheet 1 is stuck to the substantially whole of a surface of the touch panel 5 while the other surface of the double-sided pressure-sensitive adhesive sheet 1 is stuck to the substantially whole of the display surface of the LCD module 6. In this manner, the double-sided pressure-sensitive adhesive sheet 1 according to the invention is stuck both to the substantially whole of a surface of the touch panel and to the substantially whole of the display surface of the display device and used in the condition that there is no air interface between the touch panel and the display device.

Incidentally, the touch panel side transparent pressure-sensitive adhesive layer 3 of the double-sided pressure-sensitive adhesive sheet 1 is a transparent pressure-sensitive adhesive layer used for sticking the double-sided pressure-sensitive adhesive sheet 1 to the touch panel. In FIG. 2, the touch panel side transparent pressure-sensitive adhesive layer 3 is stuck to a lower surface (i.e. an outer surface of the lower electrically conductive PET film 5b) of the touch panel 5. On the other hand, the display device side transparent pressure-sensitive adhesive layer 4 of the double-sided pressure-sensitive adhesive sheet 1 is a transparent pressure-sensitive adhesive layer used for sticking the double-sided pressure-sensitive adhesive sheet 1 to the display device. In FIG. 2, the display device side transparent pressure-sensitive adhesive layer 4 is stuck to the display surface (i.e. an upper outer surface) of the LCD module 6.

In the invention, the double-sided pressure-sensitive adhesive sheet 1 has the configuration that the double-sided pressure-sensitive adhesive sheet 1 together with the touch panel can be released from the display surface of the display device again even in the case where the touch panel is stuck to the display surface of the display device through the double-sided pressure-sensitive adhesive sheet 1. The "configuration that the double-sided pressure-sensitive adhesive sheet is releasable and re-stickable to the display surface of the display device while being stuck to the touch panel" means "configuration that the double-sided pressure-sensitive adhesive sheet enables to be released from the interface between the display surface of the display device and the display device side transparent pressure-sensitive adhesive layer of the double-sided pressure-sensitive adhesive sheet in a state that the sheet is stuck to the touch panel, and the once released component which is constituted by the touch panel and the double-sided pressure-sensitive adhesive sheet enables to be stuck again to the display surface of the display device through the double-sided pressure-sensitive adhesive sheet". Incidentally, in the releasable configuration, it is important that the double-sided pressure-sensitive adhesive sheet can be released without abnormality such as cracking of the transparent electrically conductive members constituting the touch panel when the double-sided pressure-sensitive adhesive sheet together with the touch panel is released from the display surface of the display device. It is further important that the once released component of the touch panel and the double-sided pressure-sensitive adhesive sheet can be stuck again to the display surface of the display device without mixing of air bubbles caused by the glue surface roughness of the surface of the display device side transparent pressure-sensitive adhesive layer.

In the double-sided pressure-sensitive adhesive sheet 1, the releasable configuration is not particularly limited. For example, releasable configuration actuated by the relation between tackiness of the touch panel side transparent pressure-sensitive adhesive layer 3 and tackiness of the display device side transparent pressure-sensitive adhesive layer 4 may be used as the releasable configuration. For example, releasable configuration actuated when tackiness of the display device side transparent pressure-sensitive adhesive layer 4 to the display surface of the display device 6 is set to be smaller than tackiness of the touch panel side transparent pressure-sensitive adhesive layer 3 to the sticking surface of the touch panel 5 may be used as the releasable configuration. Specifically, the touch panel side transparent pressure-sensitive adhesive layer 3 may exhibit 180° peel adhesion [at a peeling rate of 300 mm/min, at 23° C. and to a polyethylene terephthalate film (PET film)] of not lower than 3.5 N/20 mm whereas the display device side transparent pressure-sensitive adhesive layer 4 may exhibit 180° peel adhesion [at a peeling rate of 300 mm/min, at 23° C. and to a triacetyl cellulose film (TAC film)] of from 0.1 N/20 mm to 3.0 N/20 mm.

Preferably, the 180° peel adhesion (at a peeling rate of 300 mm/min, at 23° C. and to a PET film) of the touch panel side transparent pressure-sensitive adhesive layer 3 may be selected to be not lower than 5.0 N/20 mm (e.g., in a range of from 5.0 N/20 mm to 25 N/20 mm), particularly not lower than 8.0 N/20 mm (e.g., in a range of from 8.0 N/20 mm to 20 N/20 mm).

Preferably, the 180° peel adhesion (at a peeling rate of 300 mm/min, at 23° C. and to a TAC film) of the display device side transparent pressure-sensitive adhesive layer 4 may be selected to be in a range of from 0.5 N/20 mm to 3.0 N/20 mm, particularly in a range of from 1.0 N/20 mm to 2.5 N/20 mm.

When the tackinesses of the display device side transparent pressure-sensitive adhesive layer and the touch panel side transparent pressure-sensitive adhesive layer have such magnitudes, the double-sided pressure-sensitive adhesive sheet together with the touch panel can be released from the display surface of the display device easily without abnormality such as cracking of the transparent electrically conductive members constituting the touch panel. Moreover, the glue surface roughness of the surface of the display device side transparent pressure-sensitive adhesive layer is restrained or prevented, so that the once released structure of the double-sided pressure-sensitive adhesive sheet and the touch panel can be stuck to the display surface of the display device without mixing of air bubbles in the interface between the display device side transparent pressure-sensitive adhesive layer and the display surface of the display device. Incidentally, if the 180° peel adhesion (at a peeling rate of 300 mm/min, at 23° C. and to a TAC film) of the display device side transparent pressure-sensitive adhesive layer is higher than 3.0 N/20 mm, abnormality such as cracking easily occurs in surfaces of the transparent electrically conductive members constituting the touch panel when the double-sided pressure-sensitive adhesive sheet together with the touch panel is released from the display surface of the display device.

For example, the 180° peel adhesion (at a peeling rate of 300 mm/min, at 23° C. and to a TAC film) of the display device side transparent pressure-sensitive adhesive layer can be measured as follows. After a polyethylene terephthalate film (e.g., 25 μm thick) is stuck onto the touch panel side transparent pressure-sensitive adhesive layer of the double-sided pressure-sensitive adhesive sheet, the resulting film is cut into a width of 20 mm. Then, a triacetyl cellulose (TAC) film as an adherend is stuck onto the display device side transparent pressure-sensitive adhesive layer of the double-sided pressure-sensitive adhesive sheet. Then, the resulting film is put into an autoclave and treated under the condition of 50° C. and a pressure of 5 atmospheres for 15 minutes. Then, the resulting film is taken out from the autoclave and left under the condition of 23° C. for 120 minutes. After the resulting film is left, the 180° peel adhesion is measured with a tensile tester in the case where the double-sided pressure-sensitive adhesive sheet is released from the adherend (which is the TAC film in this case) at a tension speed of 300 mm/min.

For example, the 180° peel adhesion (at a peeling rate of 300 mm/min, at 23° C. and to a PET film) of the touch panel side transparent pressure-sensitive adhesive layer can be measured as follows. After a polyethylene terephthalate film (e.g., 25 μm thick) is stuck onto the display device side transparent pressure-sensitive adhesive layer of the double-sided pressure-sensitive adhesive sheet, the resulting film is cut into a width of 20 mm. Then, a polyethylene terephthalate film (e.g., 188 μm thick) as an adherend is stuck onto the touch panel side transparent pressure-sensitive adhesive layer of the double-sided pressure-sensitive adhesive sheet. Then, the resulting film is put into an autoclave and treated under the condition of 50° C. and a pressure of 5 atmospheres for 15 minutes. Then, the resulting film is taken out from the autoclave and left under the condition of 23° C. for 120 minutes. After the resulting film is left, the 180° peel adhesion is measured with a tensile tester in the case where the double-sided pressure-sensitive adhesive sheet is released from the adherend (which is the polyethylene terephthalate film in this case) at a tension speed of 300 mm/min.

Incidentally, for example, it is preferable that the 180° peel adhesion (at a peeling rate of 300 mm/min, at 23° C. and to a TAC film) of the display device side transparent pressure-sensitive adhesive layer is lower than the 180° peel adhesion (at a peeling rate of 300 mm/min, at 23° C. and to a PET film) of the touch panel side transparent pressure-sensitive adhesive layer.

(Double-Sided Pressure-Sensitive Adhesive Sheet)

The double-sided pressure-sensitive adhesive sheet 1 according to the invention has layer configuration in which transparent pressure-sensitive adhesive layers are formed on opposite surfaces of the transparent base 2 as shown in FIG. 1. One of the transparent pressure-sensitive adhesive layers is the touch panel side transparent pressure-sensitive adhesive layer 3, and the other is the display device side transparent pressure-sensitive adhesive layer 4. A plastic material can be used as the material of the transparent base 2. Examples of the plastic material include: polyester such as polyethylene terephthalate (PET); polycarbonate; acrylic-based resin such as polymethyl methacrylate (PMMA); norbornene-based resin such as tradename "ARTON" made by JSR Corp.; and cyclic olefin polymer such as tradename "ZEONOR" made by Zeon Corp. One kind of plastic material may be used singly or two or more kinds of plastic materials may be used in combination. Hence, a film or sheet made of at least one of these plastic materials (hereinafter generally referred to as "plastic film") is used as the transparent base 2. Of plastic films, a plastic film such as a PET film having high transparency can be preferably used.

A suitable adhesive agent may be used as the pressure-sensitive adhesive agent constituting each of the transparent pressure-sensitive adhesive layers (the touch panel side transparent pressure-sensitive adhesive layer 3 and the display device side transparent pressure-sensitive adhesive layer 4) if the adhesive agent has enough transparency to prevent visibility of the display device from being lowered. For example, there can be used a publicly or commonly known pressure-sensitive adhesive agent such as an acrylic-based pressure-sensitive adhesive agent, a silicone-based pressure-sensitive adhesive agent, a polyester-based pressure-sensitive adhesive agent, a rubber-based pressure-sensitive adhesive agent or a polyurethane-based pressure-sensitive adhesive agent. One kind of pressure-sensitive adhesive agent may be used singly or two or more kinds of pressure-sensitive adhesive agents may be used in combination. The pressure-sensitive adhesive agent constituting the touch panel side transparent pressure-sensitive adhesive layer 3 may be the same in kind as the pressure-sensitive adhesive agent constituting the display device side transparent pressure-sensitive adhesive layer 4 or may be different in kind from the pressure-sensitive adhesive agent constituting the display device side transparent pressure-sensitive adhesive layer 4. As the pressure-sensitive adhesive agent constituting each of the transparent pressure-sensitive adhesive layers (the touch panel side transparent pressure-sensitive adhesive layer 3 and the display device side transparent pressure-sensitive adhesive layer 4), there can be preferably used an acrylic-based pressure-sensitive adhesive agent containing an acrylic-based polymer as a main component or base polymer, the acrylic-based polymer containing (meth) acrylic alkyl ester having an alkyl group with 1 to 18 carbon atoms [i.e., (meth)acrylic $C_{1-18}$-alkyl ester] as a main monomer component, from the point of view of durability.

Examples of the (meth)acrylic $C_{1-18}$-alkyl ester include methyl (meth)acrylate, ethyl (meth)acrylate, propyl (meth) acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, isooctyl (meth) acrylate, 2-ethylhexyl (meth)acrylate, nonyl (meth)acrylate, isononyl (meth)acrylate, decyl (meth)acrylate, and dodecyl (meth)acrylate. One kind of (meth)acrylic $C_{1-18}$-alkyl ester selected from these examples may be used singly or two or more kinds of (meth)acrylic $C_{1-18}$-alkyl ester selected from these examples may be used in combination.

A monomer component copolymerizable to (meth)acrylic $C_{1-18}$-alkyl ester (i.e., copolymerizable monomer) may be used in the acrylic-based polymer. Particularly when the acrylic-based polymer is to be crosslinked, a modifier monomer for modifying the acrylic-based pressure-sensitive adhesive agent may be preferably used as the copolymerizable monomer. For example, any one of various kinds of monomers known as modifier monomers for modifying the acrylic-based pressure-sensitive adhesive agent can be used as the modifier monomer. One kind of copolymerizable monomer may be used singly or two or more kinds of copolymerizable monomers may be used in combination.

Specifically, examples of the copolymerizable monomer include: copolymerizable monomers (functional group-containing copolymerizable monomers) having various kinds of functional groups (particularly, polar groups); styrene-based monomers such as styrene; and α-olefin-based monomers such as ethylene and propylene. Examples of the functional group-containing copolymerizable monomers include: vinyl esters such as vinyl acetate; cyano group-containing copolymerizable monomer such as (meth)acrylonitrile; amide group-containing copolymerizable monomer such as (meth) acrylamide, or N,N-dimethyl (meth)acrylamide; hydroxyl group-containing copolymerizable monomer such as 2-hydroxyethyl (meth)acrylate, 3-hydroxypropyl (meth)acrylate, 4-hydroxybutyl (meth)acrylate, or 6-hydroxyhexyl (meth) acrylate; epoxy group-containing copolymerizable monomer such as glycidyl (meth)acrylate; amino group-containing copolymerizable monomer such as N,N-dimethylaminoethyl (meth)acrylic alkyl ester; and carboxyl group-containing copolymerizable monomer such as (meth) acrylic acid, crotonic acid, itaconic acid, maleic acid, maleic anhydride, or fumaric acid.

Any one of the functional group-containing copolymerizable monomers can be used as the modifier monomer. Particularly, hydroxyl group-containing copolymerizable monomer or carboxyl group-containing copolymerizable monomer may be preferably used. More particularly, acrylic acid may be preferably used. Incidentally, the functional group (particularly, polar group) derived from the modifier monomer can be used for crosslinking the acrylic-based polymer.

As the polymerization method for obtaining the acrylic-based polymer, there can be used a solution polymerization method using a polymerization initiator such as an azo-based compound or peroxide, an emulsion polymerization method, a self-polymerization method, or a polymerization method using a photo-initiator for radiating light rays or radial rays. A polymerization method using a polymerization initiator for generating radicals by decomposition (i.e., a radical polymerization method) can be preferably used in the invention. In the radical polymerization, a polymerization initiator used in ordinary radial polymerization can be used. Examples of the polymerization initiator include: peroxide such as dibenzoyl peroxide or tert-butyl permaleate; and an azo-based compound such as 2,2'-azobisisobutyronitrile or azobisisovaleronitrile.

The amount of the polymerization initiator used in the radical polymerization may be an amount usually used in polymerization of an acrylic-based monomer. For example, the amount of the polymerization initiator is selected to be in a range of from 0.005 parts by weight to 10 parts by weight, preferably in a range of from 0.1 parts by weight to 5 parts by weight, when the total amount of the monomers is 100 parts by weight.

It is important that the ratio of the amount of (meth)acrylic $C_{1-18}$-alkyl ester as a main monomer component of the acrylic-based polymer is not smaller than 50% by weight with respect to the total amount of all monomer components. Preferably, the ratio of the amount of (meth)acrylic $C_{1-18}$-alkyl ester is selected to be not smaller than 80% by weight, particularly not smaller than 90% by weight. Accordingly, the ratio of the amount of the monomer copolymerizable to (meth)acrylic $C_{1-18}$-alkyl ester is smaller than 50% by weight with respect to the total amount of all monomer components.

In the invention, the acrylic-based polymer obtained by polymerization of the monomer components can be used in the condition that the acrylic-based polymer is dried. Or the acrylic-based polymer may be used in the condition that the acrylic-based polymer is crosslinked to be hardened. When the acrylic-based polymer is crosslinked, the cohesive force of the acrylic-based polymer as a pressure-sensitive adhesive agent can be improved greatly. A crosslinker can be used for hardening due to such crosslinking. That is, in addition to the acrylic-based polymer, a crosslinker may be contained in the acrylic-based pressure-sensitive adhesive agent. Incidentally, a heat crosslinking method is preferably used for crosslinking the polymer.

Examples of the crosslinker widely include known materials. Particularly, a polyfunctional melamine compound, a polyfunctional epoxy compound or a polyfunctional isocyanate compound may be preferably used as the crosslinker. One kind of crosslinker may be used singly or two or more kinds of crosslinkers may be used in combination.

Examples of the polyfunctional melamine compound include methylated trimethylol melamine, and butylated hexamethylol melamine. Examples of the polyfunctional epoxy compound include diglycidyl aniline, and glycerol diglycidyl ether. For example, the amount of the polyfunctional melamine compound and/or the polyfunctional epoxy compound used is in a range of from 0.001 parts by weight to 10 parts by weight, preferably in a range of from 0.01 parts by weight to 5 parts by weight with respect to 100 parts by weight of the polymer.

Examples of the polyfunctional isocyanate compound include tolylene diisocyanate, hexamethylene diisocyanate, polymethylene-polyphenyl isocyanate, diphenylmethane diisocyanate, diploid of diphenylmethane diisocyanate, product of reaction of trimethylol propane and tolylene diisocyanate, product of reaction of trimethylol propane and hexamethylene diisocyanate, polyether polyisocyanate, and polyester polyisocyanate. For example, the amount of the polyfunctional isocyanate compound used is in a range of from 0.01 parts by weight to 20 parts by weight, preferably in a range of from 0.05 parts by weight to 15 parts by weight with respect to 100 parts by weight of the polymer.

The acrylic-based pressure-sensitive adhesive agent may be used directly or may be used in the condition that various kinds of additives are contained in the acrylic-based pressure-sensitive adhesive agent as occasion demands. For example, a publicly or commonly known tackifier resin (such as a rosin-based resin, a terpene-based resin, a petroleum resin, a coumarone-indene resin, or a styrene-based resin) maybe added in order to adjust the adhesion of the pressure-sensitive adhesive composition containing the acrylic-based polymer as a main adhesive component. A hydrogenated tackifier is, however, used preferably from the point of view of enhancing transparency and colorlessness of the double-sided pressure-sensitive adhesive sheet 1 and suppressing variation in color tone. It is preferable that the ratio of the amount of the hydrogenated tackifier to be-mixed is small enough to prevent the haze value from increasing. Further, various kinds of known additives such as a plasticizer, a filler (e.g., fine powder silica), a colorant, an ultraviolet absorbent, and a surface active agent may be added as other additives than the tackifier resin. The amounts of these additives used may be ordinary amounts applied to the acrylic-based pressure-sensitive adhesive agent.

In the double-sided pressure-sensitive adhesive sheet 1, when each of the touch panel side transparent pressure-sensitive adhesive layer 3 and the display device side transparent pressure-sensitive adhesive layer 4 is made of the acrylic-based pressure-sensitive adhesive agent, a method such as a method of making the ratio of the modifier monomer (functional group-containing copolymerizable monomer) as low as possible, a method of making the crosslinked structure dense by using a relatively large amount of the crosslinker, or a method using a surface active agent may be used so that the tackiness of the display device side transparent pressure-sensitive adhesive layer 4 to the display surface of the display device 6 can be made lower than the tackiness of the touch panel side transparent pressure-sensitive adhesive layer 3 to the sticking surface of the touch panel 5. In the invention, adjustment is preferably made to make the ratio of the functional group-containing copolymerizable monomer as low as possible to thereby control the tackinesses of the display device side transparent pressure-sensitive adhesive layer 4 and the touch panel side transparent pressure-sensitive adhesive layer 3. In this case, it is preferable that the ratio of the amount of the functional group-containing copolymerizable monomer is not larger than 5% by weight (particularly not larger than 3% by weight) with respect to the total amount of all monomer components.

The double-sided pressure-sensitive adhesive sheet 1 can be produced by a method in which a pressure-sensitive adhesive agent for forming the touch panel side transparent pressure-sensitive adhesive layer 3 is applied onto one surface of the transparent base 2 and dried while a pressure-sensitive adhesive agent for forming the display device side transparent pressure-sensitive adhesive layer 4 is applied onto the other surface of the transparent base 2 and dried and in which the pressure-sensitive adhesive agents are crosslinked to be hardened as occasion demands when or after the pressure-sensitive adhesive agents are dried, or by a method in which the touch panel side transparent pressure-sensitive adhesive layer 3 and the display device side transparent pressure-sensitive adhesive layer 4 formed on release liners in advance are transferred onto opposite surfaces of the transparent base 2 respectively. Incidentally, the touch panel side transparent pressure-sensitive adhesive layer 3 and the display device side transparent pressure-sensitive adhesive layer 4 in the double-sided pressure-sensitive adhesive sheet 1 may be protected by release liners respectively. In this case, the double-sided pressure-sensitive adhesive sheet 1 can be used after the release liners are released so that the touch panel side transparent pressure-sensitive adhesive layer 3 and the display device side transparent pressure-sensitive adhesive layer 4 are exposed.

The thickness of the transparent base 2 is not particularly limited. For example, the thickness can be selected to be in a range of from about 5 μm to about 100 μm (preferably in a range of from about 6 μm to about 25 μm).

The thickness of each of the transparent pressure-sensitive adhesive layers (the touch panel side transparent pressure-sensitive adhesive layer 3 and the display device side transparent pressure-sensitive adhesive layer 4) is not particularly limited. For example, the thickness can be selected to be in a range of from about 5 μm to about 500 μm (preferably in a range of from about 5 μm to about 50 μm, more preferably in a range of from about 10 μm to about 30 μm). The thickness of the touch panel side transparent pressure-sensitive adhesive layer 3 maybe equal to or different from the thickness of the display device side transparent pressure-sensitive adhesive layer 4.

Incidentally, when there is used the method in which the touch panel side transparent pressure-sensitive adhesive layer 3 and the display device side transparent pressure-sensitive adhesive layer 4 formed on release liners in advance are transferred onto opposite surfaces of the transparent base 2 respectively, a release liner made of a smooth-surface plastic film (particularly a PET film) subjected to surface release treatment can be preferably used as each of the release liners.

Preferably, the double-sided pressure-sensitive adhesive sheet 1 has high transparency. Accordingly, transparent materials (the transparent base 2, the touch panel side transparent pressure-sensitive adhesive layer 3 and the display device side transparent pressure-sensitive adhesive layer 4) are used as the base and pressure-sensitive adhesive agents constituting the double-sided pressure-sensitive adhesive sheet 1. For example, it is preferable that the double-sided pressure-sensitive adhesive sheet 1 has such transparency that total light ray transmittance (according to JIS K 7361) in a visible wavelength region is not lower than 90% (preferably not lower than 91%, more preferably not lower than 95%)

For example, the haze (according to JIS K 7136) of the double-sided pressure-sensitive adhesive sheet 1 can be selected to be not higher than 2.0% (preferably not higher than 1.0%, more preferably not higher than 0.5%).

Application of the pressure-sensitive adhesive agents to the transparent base 2 or release liners can be performed by use of a commonly used coater such as an engraved-roll coater, a reverse-roll coater, a kiss-roll coater, a dip-roll coater, a bar coater, a knife coater, or a spray coater.

In the invention, each of the touch panel side transparent pressure-sensitive adhesive layer 3 and the display device side transparent pressure-sensitive adhesive layer 4 may be constituted by a plurality of layers with or without interposition of another layer if the effect of the invention is not spoiled.

Incidentally, the double-sided pressure-sensitive adhesive sheet 1 according to the invention may be cut into a suitable width and wound into a roll so that it can be used as a double-sided adhesive tape.

(Touch Panel)

An F/F type touch panel constituted by two transparent electrically conductive plastic films having electrically conductive layer-forming surfaces disposed opposite to each other is generally used as the touch panel. Alternatively, there may be used an F/G type touch panel constituted by a transparent electrically conductive plastic film (such as an electrically conductive PET film) and an electrically conductive glass sheet as shown in FIG. 3, or an F/F/P type touch panel constituted by a transparent base and two transparent electrically conductive plastic films (such as electrically conductive PET films) having electrically conductive layer-forming surfaces disposed opposite to each other as shown in FIG. 4. An example of the F/F type touch panel is shown in FIG. 2. In the example shown in FIG. 2, the touch panel 5 has two electrically conductive PET films 5a and 5b, an adhesive layer 5c, and a silver paste layer 5d. Each of the electrically conductive PET films 5a and 5b has a polyethylene terephthalate film (PET film), and a transparent electrically conductive film formed on one surface of the PET film. A transparent thin film of indium tin oxide (ITO) or the like can be used as the transparent electrically conductive film. Incidentally, the upper electrically conductive PET film 5a serves as an upper electrode while the lower electrically conductive PET film 5b serves as a lower electrode.

(Display Device)

The display device is not particularly limited. For example, besides a liquid-crystal display device (LCD module 6) as shown in FIG. 2, a cathode-ray tube, a plasma display, or an EL display can be used as the display device. Incidentally, the display surface of the LCD module 6 may be made of triacetyl cellulose (TAC) as a material.

The double-sided pressure-sensitive adhesive sheet according to the invention is preferably used so as to be stuck to the substantially whole of a surface of the touch panel and to the substantially whole of the display surface of the display device when the touch panel is stuck to the display device. Accordingly, when the double-sided pressure-sensitive adhesive sheet according to the invention is used, light loss due to reflection can be reduced because there is no air interface between the touch panel and the display device. Moreover, the double-sided pressure-sensitive adhesive sheet has high transparency, so that there is no variation in color tone as well as transmittance of light from the display device is restrained or prevented from being lowered. Hence, even if the double-sided pressure-sensitive adhesive sheet is applied to the F/F type touch panel, image or video light from the display device can be viewed clearly through the F/F type touch panel, so that visibility can be kept high for a long term.

Moreover, the double-sided pressure-sensitive adhesive sheet according to the invention is configured so that the double-sided pressure-sensitive adhesive sheet together with the touch panel can be released from the display surface of the display device again after the double-sided pressure-sensitive adhesive sheet is stuck to the touch panel and to the display surface of the display device. Accordingly, when the touch panel needs to be released from the display surface of the display device and stuck to the display surface of the same display device or a different display device again because the touch panel is stuck to the display device improperly or because of repair, recycling or the like after long-term use, the touch panel can be released from the display surface of the display device easily without cracking of the touch panel. Moreover, even in the case where the touch panel is stuck to the display device again after released, air bubbles can be prevented from being mixed due to the glue surface roughness of the surface of the display device side transparent pressure-sensitive adhesive layer. Accordingly, the double-sided pressure-sensitive adhesive sheet is excellent in re-sticking characteristic. Moreover, because the touch panel can be stuck to the display device again even in the case of improper sticking, the touch panel, the display device, etc. need not be discarded. Hence, the double-sided pressure-sensitive adhesive sheet is excellent in production cost. In addition, because the touch panel, the display device, etc. can be recycled, the double-sided pressure-sensitive adhesive sheet is excellent in resource or environmental aspects.

Accordingly, when the double-sided pressure-sensitive adhesive sheet according to the invention is used, reduction in power consumption, increase in luminance and reduction in thickness of a mobile communication terminal (e.g., a mobile telephone terminal such as a cellular-phone or a PHS machine, or a PDA terminal) having a touch panel mounted as an input device can be attained effectively.

The double-sided pressure-sensitive adhesive sheet according to the invention is used for sticking and fixing the touch panel to the display surface of the display device. The double-sided pressure-sensitive adhesive sheet is excellent in re-sticking characteristic for sticking the touch panel to the display surface of the display device again. Moreover, the double-sided pressure-sensitive adhesive sheet is excellent in light transmitting characteristic. Hence, even in the case where the double-sided pressure-sensitive adhesive sheet is applied to an F/F type touch panel, there is no variation in color tone as well as transmittance of light from the display device can be restrained or prevented from being reduced. In addition, the touch panel can be released from the display surface of the display device easily and stuck thereto again.

EXAMPLES

The invention will be described below more specifically in connection with the following examples. Incidentally, the term "parts" hereinafter used means "parts by weight", and the term "%" means "% by weight".

Preparation Example 1

Into a three-necked flask, 60 parts of ethyl acrylate, 35 parts of butyl acrylate, 5 parts of acrylic acid as monomer components of an acrylic-based polymer and 100 parts of ethyl acetate as a polymerization solvent were put and stirred for 2 hours while a nitrogen gas was introduced. After oxygen in a polymerization system was removed in this manner, 0.2 parts of azoisobutyronitrile were added to the mixture. The resulting mixture was heated to 60° C. and reacted for 10 hours to prepare a reaction solution. Ethyl acetate was added to the reaction solution to prepare an acrylic-based polymer solution (referred to as "acrylic-based polymer A solution") having 30% by weight of solid content.

Preparation Example 2

An acrylic-based polymer solution (referred to as "acrylic-based polymer B solution") having 30% by weight of solid content was prepared in the same manner as in Preparation Example 1 except that 95 parts of isooctyl acrylate and 5 parts of acrylic acid were used as monomer components of an acrylic-based polymer.

Preparation Example 3

An acrylic-based polymer solution (referred to as "acrylic-based polymer C solution") having 30% by weight of solid content was prepared in the same manner as in Preparation Example 1 except that 100 parts of 2-ethylhexyl acrylate and 0.06 parts of 3-hydroxypropyl acrylate were used as monomer components of an acrylic-based polymer.

Example 1

Into the acrylic-based polymer B solution, 2 parts of glycerol diglycidyl ether per 100 parts of the acrylic-based polymer B in the acrylic-based polymer B solution were added to prepare a pressure-sensitive adhesive solution (referred to as "pressure-sensitive adhesive agent A1") for the display device side transparent pressure-sensitive adhesive layer. On the other hand, 0.05 parts of glycerol diglycidyl ether per 100 parts of the acrylic-based polymer A in the acrylic-based polymer A solution were added into the acrylic-based polymer A solution to prepare a pressure-sensitive adhesive solution (referred to as "pressure-sensitive adhesive agent A2") for the touch panel side transparent pressure-sensitive adhesive layer.

The pressure-sensitive adhesive agent A1 was cast and applied onto one surface of a 12 µm-thick polyethylene terephthalate (PET) film (referred to as "PET filmA") and heated at 130° C. for 3 minutes to be dried so that the thickness of the pressure-sensitive adhesive agent A1 became about 20 µm after-drying. Thus, the display device side transparent pressure-sensitive adhesive layer was formed. Then, a release liner made of a release-treated PET film was stuck onto the display device side transparent pressure-sensitive adhesive layer so that the display device side transparent pressure-sensitive adhesive layer came into contact with a release-treated surface of the release liner.

On the other hand, the pressure-sensitive adhesive agent A2 was cast and applied onto a release-treated surface of a release liner made of a release-treated PET film and heated at 130° C. for 3 minutes to be dried so that the thickness of the pressure-sensitive adhesive agent A2 became about 20 µm after drying. Thus, the touch panel side transparent pressure-sensitive adhesive layer was formed. Then, the touch panel side transparent pressure-sensitive adhesive layer was stuck onto the PET film A so that the touch panel side transparent pressure-sensitive adhesive layer came into contact with the other surface of the PET film A. Thus, there was produced a double-sided pressure-sensitive adhesive sheet having the display device side transparent pressure-sensitive adhesive layer and the touch panel side transparent pressure-sensitive adhesive layer formed on opposite surfaces of the PET film A respectively.

Example 2

Into the acrylic-based polymer C solution, 1 part of glycerol diglycidyl ether per 100 parts of the acrylic-based polymer C in the acrylic-based polymer C solution was added to prepare a pressure-sensitive adhesive solution (referred to as "pressure-sensitive adhesive agent B1") for the display device side transparent pressure-sensitive adhesive layer. On the other hand, 0.05 parts of glycerol diglycidyl ether per 100 parts of the acrylic-based polymer B in the acrylic-based polymer B solution were added into the acrylic-based polymer B solution to prepare a pressure-sensitive adhesive solution (referred to as "pressure-sensitive adhesive agent B2") for the touch panel side transparent pressure-sensitive adhesive layer.

A double-sided pressure-sensitive adhesive sheet having the display device side transparent pressure-sensitive adhesive layer and the touch panel side transparent pressure-sensitive adhesive layer formed on opposite surfaces of the PET film A respectively was produced in the same manner as in Example 1 except that the pressure-sensitive adhesive agents B1 and B2 were used in place of the pressure-sensitive adhesive agents A1 and A2 respectively.

Example 3

Into the acrylic-based polymer B solution, 1.5 parts of glycerol diglycidyl ether per 100 parts of the acrylic-based polymer B in the acrylic-based polymer B solution were added to prepare a pressure-sensitive adhesive solution (referred to as "pressure-sensitive adhesive agent C1") for the display device side transparent pressure-sensitive adhesive layer. On the other hand, 0.5 parts of glycerol diglycidyl ether per 100 parts of the acrylic-based polymer A in the acrylic-based polymer A solution were added into the acrylic-based polymer A solution to prepare a pressure-sensitive adhesive solution (referred to as "pressure-sensitive adhesive agent C2") for the touch panel side transparent pressure-sensitive adhesive layer.

A double-sided pressure-sensitive adhesive sheet having the display device side transparent pressure-sensitive adhesive layer and the touch panel side transparent pressure-sensitive adhesive layer formed on opposite surfaces of the PET film A respectively was produced in the same manner as in Example 1 except that the pressure-sensitive adhesive agents C1 and C2 were used in place of the pressure-sensitive adhesive agents A1 and A2 respectively.

Comparative Example 1

Into the acrylic-based polymer B solution, 0.05 parts of glycerol diglycidyl ether per 100 parts of the acrylic-based polymer B in the acrylic-based polymer B solution were added to prepare a pressure-sensitive adhesive solution (referred to as "pressure-sensitive adhesive agent D1") for the display device side transparent pressure-sensitive adhesive layer and the touch panel side transparent pressure-sensitive adhesive layer.

A double-sided pressure-sensitive adhesive sheet having the display device side transparent pressure-sensitive adhesive layer and the touch panel side transparent pressure-sensitive adhesive layer formed on opposite surfaces of the PET film A respectively was produced in the same manner as in Example 1 except that the pressure-sensitive adhesive agent D1 was used in place of both the pressure-sensitive adhesive agents A1 and A2.

Comparative Example 2

Into the acrylic-based polymer B solution, 0.5 parts of glycerol diglycidyl ether per 100 parts of the acrylic-based polymer B in the acrylic-based polymer B solution were added to prepare a pressure-sensitive adhesive solution (referred to as "pressure-sensitive adhesive agent E1") for the display device side transparent pressure-sensitive adhesive layer. On the other hand, 0.05 parts of glycerol diglycidyl ether per 100 parts of the acrylic-based polymer B in the acrylic-based polymer B solution were added into the acrylic-based polymer B solution to prepare a pressure-sensitive adhesive solution (referred to as "pressure-sensitive adhesive agent E2") for the touch panel side transparent pressure-sensitive adhesive layer.

A double-sided pressure-sensitive adhesive sheet having the display device side transparent pressure-sensitive adhesive layer and the touch panel side transparent pressure-sensitive adhesive layer formed on opposite surfaces of the PET film A respectively was produced in the same manner as in Example 1 except that the pressure-sensitive adhesive agents E1 and E2 were used in place of the pressure-sensitive adhesive agents A1 and A2 respectively.

(Evaluation)

The double-sided pressure-sensitive adhesive sheet obtained in each of Examples 1 to 3 and Comparative Examples 1 and 2 was evaluated as to adhesion property, durability and re-sticking characteristic by the following methods. Results of the evaluation were as shown in Table 1.

(Method of Evaluating Adhesion)

After a polyethylene terephthalate film (tradename "Lumirror S-10#25" made by Toray Industries, Inc.) was stuck to a surface of the double-sided pressure-sensitive adhesive sheet opposite to the adhesion measurement surface, the film was cut into a width of 20 µm. Each adherend [a triacetyl cellulose (TAC) film or a PET film] was stuck to the adhesion measurement surface under an atmosphere of 23° C. by a forward rotation and a backward rotation of a roller with a load of 19.6 N. Then, the resulting film was treated in an autoclave at 50° C. under a pressure of 5 atmospheres for 15 minutes. Then, the resulting film was cooled to 23° C. Then, 180° peel adhesion was measured with a tensilon type peeling tester at a peeling rate of 300 mm/min.

Incidentally, a TAC film (80 µm thick) was used as the adherend when the adhesion measurement surface was on the side of the display device side transparent pressure-sensitive adhesive layer, and a PET film (188 µm thick) was used as the adherend when the adhesion measurement surface was on the side of the touch panel side transparent pressure-sensitive adhesive layer.

(Method of Evaluating Durability)

After a PET film (188 µm thick) was bonded to the touch panel side transparent pressure-sensitive adhesive layer side surface of the double-sided pressure-sensitive adhesive sheet by lamination, the resulting film was stuck onto a polarizer (tradename "SEG1425DU" made by Nitto Denko Corp.) which was formed on a glass substrate in advance. The resulting film was treated in an autoclave at 50° C. under a pressure of 5 atmospheres for 15 minutes. The resulting film was put in each of conditions of 80° C. and 60° C. and 95% RH for 500 hours to perform a weather resistance test. After the weather resistance test, durability was evaluated by eye observation as follows. "No Defect": Mixing of air bubbles, floating or the like as a defect in external appearance was not at all observed by eyes in the adhesive interface. "Defect": Mixing of some air bubbles, floating or the like was observed.

(Method of Evaluating Re-Sticking Characteristic)

A PET film (PET film thickness: 100 µm) having a transparent thin film of ITO (indium tin oxide) formed on one surface was stuck to a polarizer (tradename "SEG1425DU" made by Nitto Denko Corp.) through the double-sided pressure-sensitive adhesive sheet. The resulting film was treated in an autoclave at 50° C. under a pressure of 5 atmospheres for 15 minutes. The ITO-containing PET film was released at a peeling rate of 300 mm/min and at a peel angle of about 30° to about 60°. A sense of peeling resistance in this case, the presence of mixing of air bubbles caused by the glue surface roughness in the case where the ITO-containing PET film was stuck to the polarizer through the double-sided pressure-sensitive adhesive sheet again and the presence of cracking of the ITO-containing PET film were checked by eye observation so that re-sticking characteristic of the double-sided pressure-sensitive adhesive sheet was evaluated as follows. "No Failure": There was no failure. "Failure": There was some failure such as heavy peeling resistance, mixing of air bubbles or cracking.

Incidentally, in the method of evaluating re-sticking characteristic, the ITO-containing PET film was equivalent to the lower electrode of the F/F type touch panel, and the polarizer was equivalent to the display surface of the display device.

TABLE 1

| | Example | | | Comparative Example | |
|---|---|---|---|---|---|
| | 1 | 2 | 3 | 1 | 2 |
| Display device side transparent pressure-sensitive adhesive layer | | | | | |
| Kind of acrylic-based polymer | Acrylic-based polymer B | Acrylic-based polymer C | Acrylic-based polymer B | Acrylic-based polymer B | Acrylic-based polymer B |
| Ratio of crosslinker to acrylic-based polymer [Parts] | 2 | 1 | 1.5 | 0.05 | 0.5 |
| Touch panel side transparent pressure-sensitive adhesive layer | | | | | |
| Kind of acrylic-based polymer | Acrylic-based polymer A | Acrylic-based polymer B | Acrylic-based polymer A | Acrylic-based polymer B | Acrylic-based polymer B |
| Ratio of crosslinker to acrylic-based polymer [Parts] | 0.05 | 0.05 | 0.5 | 0.05 | 0.05 |
| Adhesion | | | | | |
| Display device side transparent pressure-sensitive adhesive layer (to TAC film) [N/20 mm] | 1.5 | 1.2 | 2.5 | 12.4 | 3.7 |
| Touch panel side transparent pressure-sensitive adhesive layer (to PET film) [N/20 mm] | 16.2 | 8.9 | 3.9 | 8.9 | 8.9 |
| Durability | | | | | |
| 80° C. | No Defect | No Defect | No Defect | No Defect | No Defect |
| 60° C. × 95% RH | No Defect | No Defect | No Defect | No Defect | No Defect |
| Re-sticking characteristic | No Failure | No Failure | No Failure | Failure (*1) | Failure (*2) |

(*1): It was difficult to release the ITO-containing PET film.
(*2): Cracking was observed.

According to Table 1, in the double-sided pressure-sensitive adhesive sheet obtained in each of Examples 1 to 3, the tackiness of the display device side transparent pressure-sensitive adhesive layer exhibits a moderate value which is lower than the tackiness of the touch panel side transparent pressure-sensitive adhesive layer. Accordingly, the double-sided pressure-sensitive adhesive sheet together with the touch panel can be released from the display surface of the display device easily. Moreover, the double-sided pressure-sensitive adhesive sheet can be stuck to the display surface of the display device again without mixing of air bubbles. Hence, the double-sided pressure-sensitive adhesive sheet is very excellent in re-sticking characteristic. In addition, the double-sided pressure-sensitive adhesive sheet is excellent in durability, so that the bonding state can be kept good even in the case where the double-sided pressure-sensitive adhesive sheet is used for a long term.

What is claimed is:

1. A double-sided pressure-sensitive adhesive sheet for adhering a touch panel to a display surface of a display device, comprising:
   a transparent base;
   a first transparent pressure-sensitive adhesive layer formed on one surface of said transparent base, said first transparent pressure-sensitive adhesive layer forming a first surface of said double-sided pressure-sensitive adhesive sheet; and
   a second transparent pressure-sensitive adhesive layer formed on an opposing surface of said transparent base, said second transparent pressure-sensitive adhesive layer forming a second surface of said double-sided pressure-sensitive adhesive sheet,
   wherein said first surface of said double-sided pressure-sensitive adhesive sheet is capable of adhering to substantially an entire surface of the touch panel and said second surface of said double-sided pressure-sensitive adhesive sheet is capable of adhering to substantially an entire surface of a display surface of the display device, and
   wherein said second surface of said double-sided pressure-sensitive adhesive sheet is releasable and re-stickable to said display surface of said display device while said first surface of said double-sided pressure-sensitive adhesive sheet is capable of remaining adhered to said touch panel, and
   wherein said first transparent pressure-sensitive adhesive layer exhibits 180° peel adhesion of not lower than 3.5 N/20 mm, at a peeling rate of 300 mm/min, at 23° C. and to a polyethylene terephthalate film; and
   wherein said second transparent pressure-sensitive adhesive layer exhibits 180° peel adhesion from 0.1 N/20 mm to 3.0 N/20 mm, at a peeling rate of 300 mm/min, at 23° C. and to a triacetyl cellulose film, and wherein each of the first and second transparent pressure-sensitive adhesive layers includes an acrylic based pressure-sensitive adhesive agent containing:

an acrylic-based polymer as a main component, the acrylic-based polymer containing (meth)acrylic alkyl ester having an alkyl group with 1 to 18 carbon atoms, and functional group-containing copolymerizable monomers in the ratio of the amount thereof is not larger than 5% by weight with respect to the total amount of all monomer components; and a cross linker.

2. A double-sided pressure-sensitive adhesive sheet according to claim 1, wherein said double-sided pressure-sensitive adhesive sheet has a total light ray transmittance of not lower than 90% in a visible wavelength region and has a haze of not higher than 2.0%.

* * * * *